(12) United States Patent
Gay et al.

(10) Patent No.: US 9,361,491 B2
(45) Date of Patent: *Jun. 7, 2016

(54) ANTENNA INTERFACE FOR RADIO FREQUENCY IDENTIFICATION CIRCUIT

(71) Applicant: MARVELL WORLD TRADE LTD., St. Michael (BB)

(72) Inventors: Michael J. Gay, Coppet (CH); Francois Louis Dorel, Thonon-les-Bains (FR); Frederic Declercq, Cossonay (CH)

(73) Assignee: MARVELL WORLD TRADE LTD. (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/492,131

(22) Filed: Sep. 22, 2014

(65) Prior Publication Data

US 2015/0009017 A1 Jan. 8, 2015

Related U.S. Application Data

(63) Continuation of application No. 13/648,406, filed on Oct. 10, 2012, now Pat. No. 8,847,735.

(60) Provisional application No. 61/546,354, filed on Oct. 12, 2011.

(51) Int. Cl.
| | |
|---|---|
| *H04Q 5/22* | (2006.01) |
| *G06K 7/10* | (2006.01) |
| *G06K 19/077* | (2006.01) |
| *G06K 19/07* | (2006.01) |

(52) U.S. Cl.
CPC ........ *G06K 7/10237* (2013.01); *G06K 7/10336* (2013.01); *G06K 19/0724* (2013.01); *G06K 19/07749* (2013.01)

(58) Field of Classification Search
CPC .......................... G06K 7/10366; G06K 7/1009
USPC ..................................... 340/10.1, 12.5, 13.25
See application file for complete search history.

(56) References Cited

U.S. PATENT DOCUMENTS

| | | | |
|---|---|---|---|
| 7,706,834 B2 | 4/2010 | Kim | |
| 8,593,254 B2 | 11/2013 | Okuda | |
| 8,847,735 B2 * | 9/2014 | Gay ................... | G06K 7/10237 340/10.1 |

FOREIGN PATENT DOCUMENTS

| | | |
|---|---|---|
| WO | 2006/095186 A1 | 9/2006 |
| WO | 2008/117029 A2 | 10/2008 |

* cited by examiner

*Primary Examiner* — Vernal Brown (57) ABSTRACT

Systems, methods, and other embodiments associated with radio frequency identification (RFID) circuits are described. According to one embodiment, a radio frequency identification circuit includes an antenna network and an integrated circuit configured to operate as a reader and a tag in combination with the antenna network. The integrated circuit is configured to provide an output admittance determined by a ratio of current and voltage negative feedback signals such that a frequency response of the combined integrated circuit and antenna network is adjustable when operating as a reader.

17 Claims, 7 Drawing Sheets

ANTENNA INTERFACE FOR RADIO FREQUENCY IDENTIFICATION CIRCUIT

CROSS REFERENCE TO RELATED APPLICATIONS

This patent disclosure is a continuation of U.S. application Ser. No. 13/648,406 filed on Oct. 10, 2012, now U.S. Pat. No. 8,847,735 which claims priority under 35 U.S.C. §119(e) to U.S. Provisional Application Ser. No. 61/546,354, filed Oct. 12, 2011, which is incorporated herein by reference in its entirety for all purposes.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Radio-frequency identification (RFID) provides for communication via radio waves to transfer stored data from a tag to a reader. A reader is configured to transmit radio frequency waves (RF) to a tag to collect data from the tag, and the tag may be configured to transfer stored data to the reader by modulating the transmitted RF in a manor detectable and understood by the reader. A tag configured to modulate transmitted RF is typically powered by the transmitted RF and is typically not self-powered, such as by a battery or the like. Alternatively, a tag may be configured to independently transmit RF back to the reader after the tag detects a known RF signal transmitted by a reader if the tag is self-powered. Because RFID uses radio waves for communication, the tag and the reader do not have to contact one another. This non-contact communication of RFID contrasts the typical communication between a card with a magnetic stripe (mag stripe) and a mag stripe reader where the mag stripe of the card is run through the mag stripe reader so that a pick-up coil or the like in the mag stripe reader can read information encoded in the mag stripe. This non-contact communication of RFID also contrasts with the typical communication between a smart card and a smart card reader where the electrical contacts on the smart card make electrical contact with corresponding electrical contacts on the smart card reader so that the smart card reader can read or write information on the smart card.

Due to the non-contact communication of RFID, numerous applications have been developed for this technology. The applications often center around a reader being able to identify a tag as being unique by collecting unique information stored in the tag, for example, in a semiconductor memory. For example, tags are often used in employee badges, which are provided to employees of a company so that an employee may hold her employ badge up to a reader to gain entry to the company's buildings. People without a tag encoded with the particular unique information for accessing the company's building will generally be denied entry to the company's buildings by the reader, which would not collect the particular unique information for building entry. The foregoing example of employees gaining secure entry to a building is one example of a more general application of access control.

In addition to access control, RFID is also used for the identification of products, automobiles, animals, and are used for electronic passports and electronic ticketing. For example, via the detection of products on store's shelves where the products include tags, a relatively quick and accurate inventory of products may be taken.

Additional applications of RFID include banking applications, applications for making purchases, reading tags embedded in smart posters and the like. For these additional applications a mobile device (e.g., a smart phone, a personal digital assistant, an iPod like device, etc.) may include a reader and a tag. For example, a mobile device that includes a reader may be configured to read a tag in a smart poster and display a website associated with the smart poster. Alternatively, a mobile device's tag may be read by a reader external to the mobile device for a purchase that the user of the mobile device is making and the reader may affect a charge to the user's bank account for the purchase.

Near field communication (NFC) is one particular type of RFID where the interaction distances between a reader and a tag are relatively short, for example, up to about 3 centimeters. The relatively short communication lengths of NFC provide one measure of security from a tag being read surreptitiously by a fraudulent user. Therefore, NFC is particularly well suited for use for applications requiring high levels of security, such as the exchange of personal health information, pairing devices (e.g., pairing a headset to a mobile device, pairing two mobile devices, etc.), banking transactions, consumer purchases, or other monetary transactions.

One goal of the standardization organizations that set the standards for RFID and NFC is that a reader and a tag in a mobile device share an antenna. One reason for this goal is to minimize the number of antennas in a mobile device so that interference between the often numerous antennas in mobile devices may be minimized. For example, a typical smart phone may include a radio frequency (RF) antenna for mobile telephone type communications (e.g., voice, messaging, etc.), a WiFi antenna for Internet type communications, a BlueTooth antenna, and a GPS antenna for GPS type communications. Providing one antenna for a reader and a tag limits the design considerations for reducing antenna interference. Further, providing that a reader and a tag share an antenna in a mobile device limits the number of electronic components included in the mobile device and thereby limits the cost of manufacturing the mobile device.

A number of design objectives and concerns exist for a reader and a tag sharing an antenna in a mobile device. For example, one design provides a single integrated circuit (the single integrated circuit is referred to herein as the "IC") configured to operate as a reader and as a tag in combination with the antenna. Some designs for the IC try to have as few pins as possible that connect with an antenna interface between the IC and the antenna. The IC may provide for frequency tuning to support various antenna sizes and to tune the antenna to avoid interference with other RF signals. Some mobile device manufacturers specify the use of a relatively large antenna that is in the periphery of the mobile device, whereas other mobile device manufacturers specify the use of a relatively smaller antenna. The IC may also provide for relatively high power dissipation for an antenna collecting relatively large RF energy from a reader emitting a relatively strong RF field. Typically, the dissipation of relatively high power requires a relatively large semiconductor substrate to provide for relatively high power dissipation. As is typical of numerous circuits in mobile devices, mobile device manufacturers make attempts to reduce the foot prints of RFID circuits in mobile devices.

Other designs for a reader and a tag sharing an antenna may include providing that the IC and the antenna have a relatively high transmission drive capability to drive a relatively high power RF signal for reader operation with a weak tag operating according to relatively older ISO operating standards. The IC and antenna may be configured to have a relatively sensitive receiver sensitivity so the IC and antenna operating as a tag are sensitive to a relatively weak reader and/or provide for relatively larger operating distance from the reader (e.g., up to about 2 centimeters). In a reader mode, the drive current of an antenna may be set to a relatively small value if a tag is not detected by the reader, and may be set to a higher value if a tag is detected by the reader. In some designs, the IC and the antenna operating as a tag sufficiently load modulates a received signal from the reader so that the reader may detect the tag, for example at relatively large distances. The IC and the antenna operating as a reader may be sufficiently sensitive to load modulation of the received signal by a tag so that the reader may acquire data from the tag at relatively large distances. It is difficult to achieve these types of designs in a single RFID circuit design.

Figure 1:
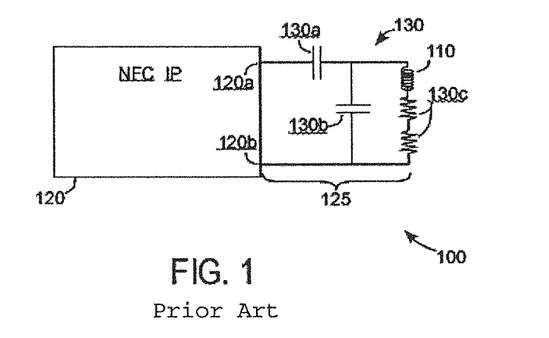
FIG. 1 is a simplified schematic of a prior art RFID circuit.

As described briefly above, in an RFID circuit the set of external components that lie between the IC and the antenna are often referred to as the antenna interface. The antenna interface tends to have a strong influence over whether an RFID circuit operating as a reader and a tag performs properly. FIG. 1 is a simplified schematic of a known RFID circuit 100. RFID circuit 100 includes a single antenna 110, an IC 120, and an antenna interface 125, which includes a set of external components 130. Antenna interface 125 lies between antenna 110 and IC 120 and is generally identified by the bracket 125 shown in FIG. 1. IC 120 is configured to operate as both a reader and a tag in combination with antenna 110 and antenna interface 125. IC 120 includes first and second pins 120a and 120b for connection with the antenna interface and the antenna.

The particular external components of the set of external components, and the particular configuration of the external components provides that numerous of the foregoing described design objective for RFID, and particularly NFC, may not be met by RFID circuit 100. Specifically, the set of external components includes a first capacitor 130a in series with a second capacitor 130b where the second capacitor is on the antenna side of the first capacitor and is parallel with the antenna. More specifically, the first capacitor is coupled to first pin 120a of IC 120 and the second capacitor is coupled to second pin 120b of IC 120. The set of external components 130 also includes a set of resistors 130c, which is coupled between the antenna and the second capacitor and is coupled to the second pin 120b of IC 120.

The external components and the configuration of the external components provides, for example, that the NFC Forum Specifications for NFC cannot be met at relatively low operating supply voltage (e.g., less than 3 volts).

Further, due to the configuration of the external components, the antenna and antenna interface of RFID circuit 100 cannot be resonant at the NFC carrier frequency when IC 120 acts as a tag, with a relatively high port impedance, if it is resonant at that frequency when IC 120 acts as a reader, with a relatively low port impedance. Not being able to maintain the resonant frequency provides that the RFID circuit may be mis-tuned in a tag mode which increases the sensitivity to interfering signals.

Another deficiency of RFID circuit 100 is that the antenna interface and antenna form a series resonant network at the antenna port. Consequently, when RFID 100 operates in reader mode, the drive current of IC 120, is a maximum when the combination of the antenna and antenna interface, hereinafter referred to as the antenna network, is precisely tuned and is then proportional to the operating Q. The network is precisely tuned and the operating Q is a maximum when no tag is present. The drive current of IC 120 is therefore substantially a maximum if no tag is present for being read, and reduces if a tag is present for the reader to read. With the drive current of the RFID circuit at substantially a maximum if no tag is present, battery power of a mobile device, which includes the RFID circuit, will be used at a relatively high rate for the majority of operation time of the mobile device because for a majority of the operation time a tag is not present for being read. Furthermore, the resistors, 130c, of the antenna interface of RFID circuit 100, which serve to reduce the maximum Q of the antenna interface and antenna and thereby reduce the maximum drive current, also reduce the sensitivity when RFID circuit 100 acts as a tag.

SUMMARY

In one embodiment, a radio frequency identification (RFID) circuit comprises an antenna network, including an antenna and an antenna interface coupled to the antenna, configured to transmit and receive radio frequency waves, wherein the antenna interface includes at least one capacitor coupled with the antenna; and an integrated circuit including at least one pin coupled to at least one node of the at least one capacitor of the antenna interface, wherein the integrated circuit is configured to operate as a reader and a tag in combination with the antenna network, and wherein the integrated circuit comprises output current and output voltage negative feedback loops and is configured to provide an output admittance determined by a ratio of signals from the current and voltage negative feedback loops, at least when the RFID operates as a reader, such that a frequency response of the combined integrated circuit and antenna is adjustable to selective characteristics when operating as the reader.

In another embodiment, the current and voltage negative feedback signals of the integrated circuit are configured such that the output admittance includes a resistive component, which increases an operational bandwidth of the combined integrated circuit and antenna network to a selected value. In another embodiment, the current and voltage negative feedback signals of the integrated circuit are configured such that the output admittance includes a reactive component, which tunes a resonant frequency of the combined integrated circuit and antenna network to a selected value.

In another embodiment, a radio frequency identification (RFID) circuit includes an antenna network including an antenna and an antenna interface coupled to the antenna, configured to transmit and receive radio frequency waves, wherein the antenna interface includes a first capacitor and a second capacitor coupled in series with the antenna. An integrated circuit includes an antenna port comprising a first contact and a second contact coupled respectively to a first node and a second node of the second capacitor of the antenna interface. The integrated circuit is configured to operate as a reader and a tag in combination with the antenna network. The integrated circuit includes an output current and output voltage negative feedback loops from the first contact and the second contact that are input to an output amplifier. The integrated circuit is configured to produce a controllable output admittance at the antenna port by applying signals from the output current and output voltage negative feedback loops around the output amplifier.

In another embodiment, a method includes receiving radio frequency waves with an antenna, and wherein an integrated circuit is configured to operate as a reader and a tag in combination with the antenna network; providing an output current negative feedback signal and an output voltage negative feedback signal from the antenna to the integrated circuit; and generating an output admittance determined by a ratio of the output current negative feedback signal and the output voltage negative feedback signal when operating as a reader to cause a frequency response of the integrated circuit and the antenna to be adjustable to selected characteristics without increasing power consumption.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or that multiple elements may be designed as one element. In some examples, an element shown as an internal component of another element may be implemented as an external component and vice versa.

DETAILED DESCRIPTION

Described herein are systems, methods, and other embodiments that relate to antennas. More particularly, embodiments relate to antenna interfaces for antennas including circuits for radio frequency identification (RFID).

Figure 2:
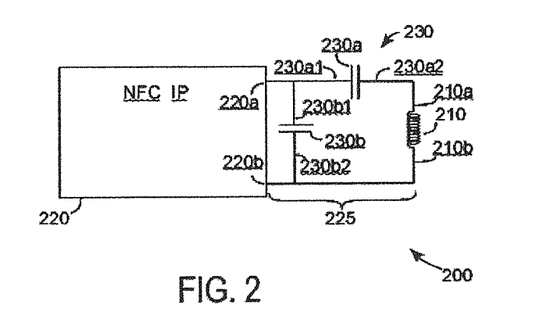
FIG. 2 is a simplified schematic of a RFID circuit according to one embodiment of the disclosure.

FIG. 2 is one embodiment of a simplified schematic of an RFID circuit 200. RFID circuit 200 includes an antenna 210, an integrated circuit IC 220, and an antenna interface 225. Antenna interface 225 includes a set of external components 230. Antenna interface 225 is generally identified by the bracket shown in FIG. 2. IC 220 is configured to operate as both a reader and a tag in combination with antenna 210 and antenna interface 225.

IC 220 includes a first pin 220a and a second pin 220b, which are electrically coupled to the antenna network. While IC 220 is described as having pins, the pins may be electrical contacts of a variety of types, such as the pads of an IC package, solder bumps on an IC package or the IC itself, jacks, etc. The first pin 220a and the second pin 220b provide a bidirectional transmission and reception port for the IC. The set of external components 230 includes a first capacitor 230a and a second capacitor 230b. The first capacitor includes a first node 230a1 coupled to first pin 220a, and includes a second node 230a2 coupled to a first node 210a of antenna 210. The term coupled as used herein includes directly coupled. The first node 230a1 of first capacitor 230a is also coupled to a first node 230b1 of second capacitor 230b. The first node 230b1 of second capacitor 230 is coupled to first pin 220a of the IC, and the second node 230b2 of second capacitor 230 is coupled to the second pin 220b of the IC. The second node 230b2 of second capacitor 230b is also coupled to a second node 210b of antenna 210.

The antenna network of FIG. 2 provides a parallel resonant circuit at the port 220a, 220b of IC 220. The port impedance can therefore be high, both when the RFID acts as a reader and when it acts as a tag. The antenna network can then be resonant at the carrier frequency in both modes of operation.

As the antenna network provides a parallel resonant circuit at the port 220a, 220b, the current which IC 220 should supply to produce a desired current through antenna 210, and hence a desired field strength, is a minimum when the antenna network is precisely tuned, and varies inversely with the operating Q of the antenna network.

As the presence of a tag changes the resonant frequency and reduces the operating Q it follows that the current which IC 220 should supply is a minimum with no tag present and tends to increase as a tag is brought into proximity.

Because the current which IC 220 should supply to produce a desired current through antenna 210 varies inversely with the operating Q of the antenna network it follows that the Q is desirably high to minimize the power consumption of the IC. The Q is also desirably high to maximize the sensitivity of the RFID when it acts as a tag. If the Q is too high, however, the RFID cannot satisfy certain transient response requirements when operating as a reader with the output signal modulated for data transmission.

The Q could be reduced by adding resistors to the antenna interface, as in the example of the RFID of FIG. 1, but, since these would absorb energy, their incorporation would increase the minimum current required from IC 220. It would also degrade the detection of load modulation data from a tag and reduce the sensitivity when the RFID acts as a tag.

Figure 3:
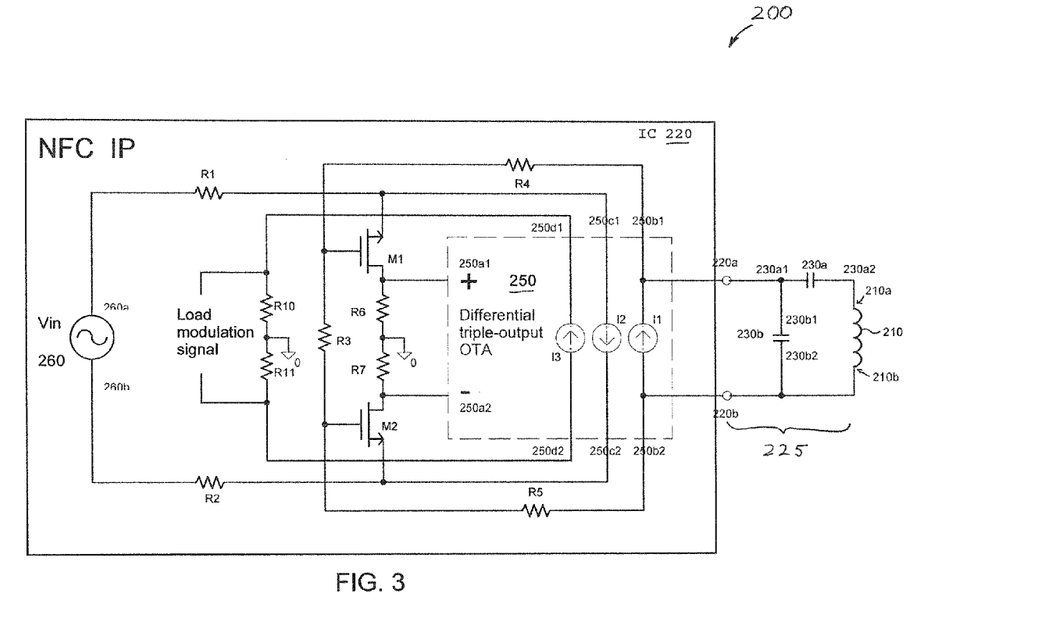
FIG. 3 is an example schematic of a RFID circuit according to a first embodiment of the disclosure.

The embodiments shown in FIG. 3 and the other embodiments circumvent this problem by configuring the integrated circuit 220 to provide a desired output admittance at the antenna port, when acting as a reader. This output admittance can be dimensioned (e.g., adjusted, controllable) such that the integrated circuit and antenna network have selected characteristics, such as a desired Q and resonance.

As the admittance is generated by the integrated circuit 220, the operational Q is reduced without any increase in the output current it needs to supply. Furthermore the operational Q may be reduced only when the RFID 200 operates in reader mode: in tag mode the circuits generating the output admittance may be disabled.

Note that the figures show only those parts of IC 220 used for operation as a reader, which are pertinent to this embodiment. It will be understood that the nodes 220a and 220b will also be coupled to the elements that implement functions used for operation as a tag, which are not shown.

FIG. 3 is a simplified schematic of the RFID circuit 200 of FIG. 2 that illustrates details of one embodiment of the IC 220.

In the ensuing discussion, the terms voltage and current refer to signal voltages and currents. Furthermore, the essential bias current and bias voltage generators have been omitted for clarity. It will be understood, then, that the term ground reference refers to a node at which no signal voltage is developed.

In this embodiment IC, 220, includes a differential operational transconductance amplifier (OTA) 250, having input nodes 250a1, 250a2 coupled to a carrier signal generator 260, and providing a first output current I1, flowing between nodes 250b1 and 250b2 and coupled to the antenna port 220a, 220b. The amplifier (OTA) 250 is configured to provide sufficient current to the antenna network to produce magnetic field strengths specified in the NFC standards, or others to which it may be desirable to conform.

OTA 250 also provides a second output current I2, flowing between nodes 250c1 and 250c2, and a third output current I3, flowing between nodes 250d1 and 250d2, which are proportional to the first output current but in one embodiment are substantially smaller (e.g., 100 to 1000 times smaller). Such smaller, proportional currents may be produced by, for example, the outputs of a plurality of small transistors having input nodes coupled to corresponding nodes of a plurality of large output transistors. Of course, other configurations of elements can be implemented.

The input voltage at port 250a1, 250a2 of OTA 250 is provided by differential signal summing circuit which produces an output proportional to the difference between an input signal, Vin, and the sum of negative feedback signals derived, one from the antenna port voltage and one from the antenna port current.

There are many circuit configurations to implement voltage summing functions. The method and configuration disclosed herein is only one embodiment, which is used to explain the operation of the IC 220, but is not intended to be limiting.

The illustrative summing circuit employs a first and second transistors M1, M2 having their drain nodes coupled, respectively, to first nodes of nominally equal load resistors R6, R7 and to the input nodes 250a1, 250a2 of OTA 250. The second nodes of resistors R6, R7 are coupled to a ground reference. The input voltage, Vin, is coupled to the source nodes of transistors M1, M2 via nominally equal resistors R1, R2, respectively.

A pair of nominally equal resistors, R4, R5, have first nodes coupled respectively to the antenna port pins, 220a, 220b, and second nodes coupled respectively to the gate nodes of transistors M1, M2. A resistor R3 is coupled between the gate nodes of transistors M1, M2. The voltage developed across R3 and coupled differentially to the gate nodes of M1, M2 is therefore a fraction R3/(R4+R5) of the antenna port voltage. The sense of the OTA transconductance and of the connections described is such that the voltage developed across R3 provides negative feedback.

The output current nodes 250c1 and 250c2 of OTA 250 are coupled respectively to the source nodes of transistors M1, M2. Applying Thevenin's theory these currents can be replaced by equivalent voltages in series with the resistors R1, R2. These voltages are equal to the antenna port current divided by a ratio of the OTA 250 output currents, N, where N=I1/I2 and multiplied by the resistor values. The sense of the currents and of the connections described is such that the voltages developed across R1 and R2 provide negative feedback.

In one embodiment, the loop gain of the configuration is sufficient to ensure that the input voltage, $V_{in}$, is sensibly equal to the sum of the negative feedback voltages. Then, if the antenna port voltage is $V_{ant}$ and the antenna interface 225 and antenna 210 provide an admittance $Y_{ant}$ at the antenna port the voltage relationships are:

$$V_{in} = V_{ant}\frac{R3}{R3+R4} + V_{ant}\frac{Y_{ant}(R1+R2)}{N}$$

or

-continued $$V_{ant} = V_{in}\frac{1}{\frac{R3}{R3+R4}+\frac{Y_{ant}(R1+R2)}{N}}$$

The unloaded voltage gain, Mo is:

$$Mo = \frac{R4+R5}{R3}$$

The output admittance, $Y_{out}$, is the value of $Y_{ant}$ which would reduce the voltage gain, to half its unloaded value, that is:

$$Y_{out} = \frac{NR3}{(R3+R4)(R1+R2)}$$
$$= \frac{N}{Mo(R1+R2)}$$

In this embodiment the output admittance is purely real. It is effectively connected in parallel with capacitor 230b. The parameters can therefore be chosen to reduce the operational Q of the antenna network, so that the modulation transient response specifications can be met.

Although the operational Q of the antenna network may be reduced in the manner described, the network itself is unchanged. The bandwidth may thus be increased without increasing the current required from OTA 250 to produce a desired magnetic field strength.

In this embodiment a load modulation signal is obtained by coupling the nodes 250d1, 250d2 to the first nodes of nominally equal resistors, R10, R11, which have second nodes coupled to a ground reference.

Figure 4:
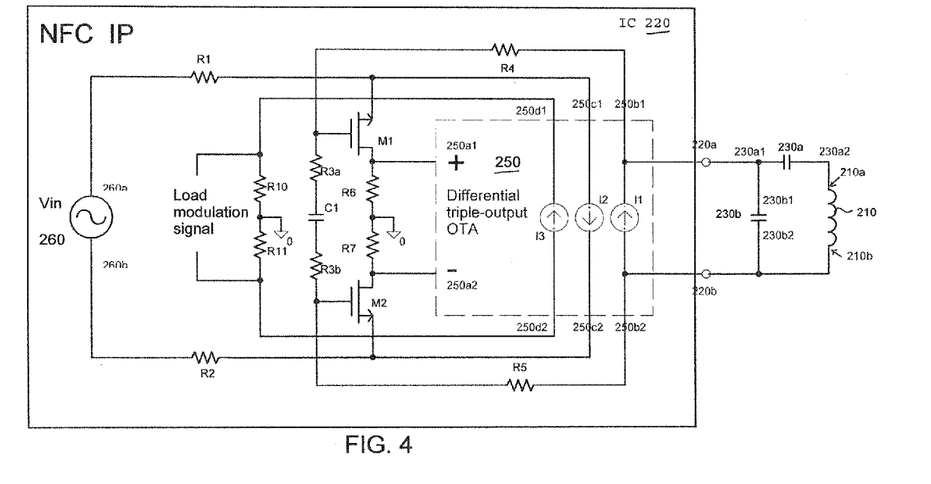
FIG. 4 is an example schematic of a RFID circuit according to a second embodiment.

FIG. 4 illustrates another embodiment of the IC 220 from FIG. 3 that is configured to have a complex output admittance. In this embodiment the complex form is obtained by replacing the resistor R3 of FIG. 3 by the branch R3a, C1, R3b.

The voltage feedback factor, Bv, say, then becomes $$Bv = \frac{1+j\omega C1(R3a+R3b)}{1+j\omega C1(R3a+R3b+R4+R5)}$$
$$= \frac{1+j\omega AvTv}{1+j\omega Tv}$$

where $Av = \frac{R3a+R3b}{R3a+R3b+R4+R5}$ and Tv=C1(R3a+R3b+R4+R5)
and ω is the carrier angular frequency
and j is the imaginary operator.

The output admittance becomes $$Y_{out} = \frac{BvN}{R1+R2}$$
$$= \frac{1+j\omega AvTv}{1+j\omega Tv}\frac{N}{R1+R2}$$

which can comprise parallel conductive and inductive components at the carrier frequency.

It will be understood that frequency dependent networks of varying configurations could be incorporated in the voltage and/or current feedback paths to produce output admittances with reactive components.

Furthermore, incorporating variable elements would permit variable tuning of the antenna network resonant frequency and bandwidth. Thus, in one embodiment, the output impedance is used for controlling the bandwidth and the resonance of the antenna connected to the antenna network.

The load modulation signal is obtained uniquely from an image of the antenna port current in the embodiments shown in FIG. 3 and FIG. 4. In one embodiment, the load modulation signal is obtained from a fraction of the antenna port voltage and a fraction of the antenna port current.

Modulation of the antenna load produces a modulation of the antenna port voltage which is of opposite sense to the corresponding modulation of the antenna port current. The components of the load modulation signal obtained from each are therefore subtracted. This subtraction is implemented in the embodiment shown in FIG. 5.

Figure 5:
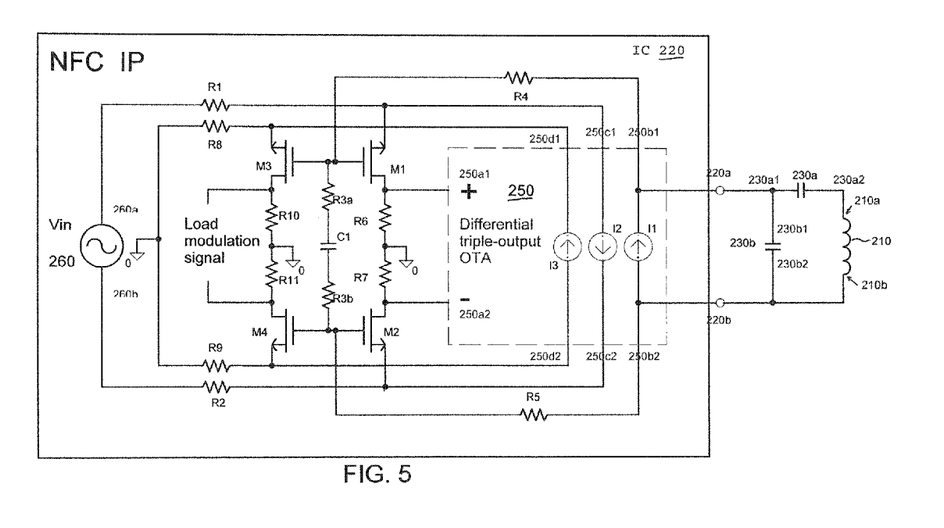
FIG. 5 is an example schematic of a RFID circuit according to a third embodiment.

The antenna port 220a, 220b voltage feedback signal coupled to the gates of the first and second transistors M1, M2 is also coupled respectively to the gates of third and fourth transistors, M3, M4. The output current nodes 250d1 and 250d2 of OTA 250 are coupled respectively to the source nodes of transistors M3 and M4, which are also coupled to the first nodes of nominally equal resistors R8, R9, which have second nodes coupled to a ground reference.

The output current I3 of OTA 250 flows in opposite sense to the output current I2. The circuit is configured such that the voltage developed by the current I2 across resistors R1 and R2, adds to the differential voltage established between the gate nodes of transistors M1 and M2. Consequently the voltage developed by the current I3 across resistors R8 and R9, subtracts from the differential voltage established between the gate nodes of transistors M3 and M4. The load modulation signal in this embodiment is thereby additively derived from the modulation of the antenna port current and the antenna port voltage (e.g., port 220a, 220b).

In another embodiment, the gate nodes of transistors M3 and M4 could be coupled to receive a fraction of the antenna port voltage which differs from that provided between the gate nodes of transistors M1 and M2. Likewise the subtraction of the signals derived from the antenna port voltage and current could be affected with other circuit configurations.

FIG. 5 illustrates another embodiment of the IC 220 that is configured to provide a larger load modulation signal than that provided by the embodiments of FIG. 3 and FIG. 4. The carrier level of this signal may, however, also be larger and, in particular, the modulation index may be reduced when the antenna current is small, for example, when RFID 200 is in communication with a tag separated by near the maximum operational distance.

Figure 6:
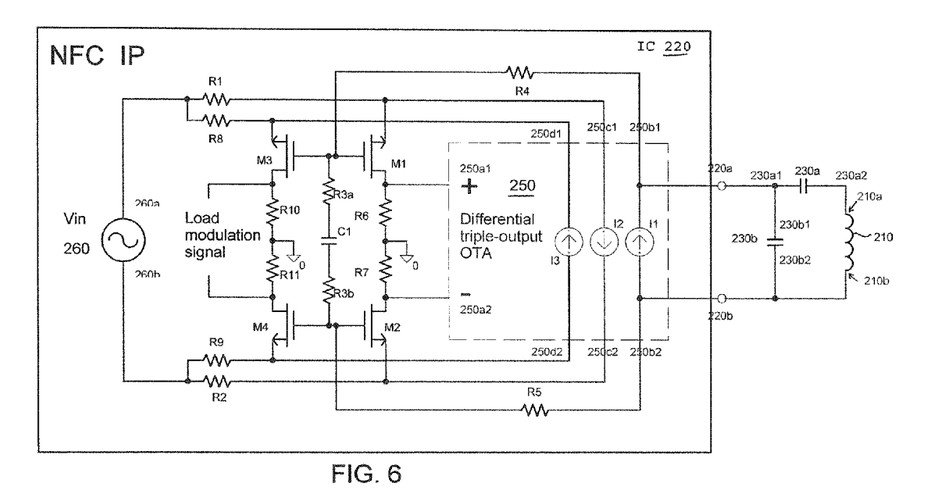
FIG. 6 is an example schematic of a RFID circuit according to a fourth embodiment.

The embodiment shown in FIG. 6 offers improved performance when the antenna current is small.

The improvement is achieved by coupling the second nodes of resistors R8 and R9, respectively to nodes 260a and 260b of the input voltage generator 260.

With no load modulation, and high loop gain, the input signal is sensibly equal to the sum of the feedback signals derived from the antenna port voltage and from the antenna port current. The load modulation signal in the embodiment of FIG. 5 is obtained from the difference of corresponding signals. In the embodiment of FIG. 6, as the gate nodes of transistors M3 and M4 are coupled, respectively, to the gate nodes of transistors M1 and M2, the load modulation signal derived from the antenna port voltage is equal to the corresponding feedback signal component.

It follows that the differential voltage developed between the gate nodes of transistors M3 and M4 from the antenna port voltage will be matched by that fraction of the input voltage matching the antenna voltage feedback component.

The carrier level of the load modulation signal produced by this embodiment is thus simply proportional to the antenna port current and independent of the voltage. It is therefore low when the antenna port current is low, so the modulation index is improved.

Note that cancellation of the carrier component derived from the antenna voltage signal does not imply cancellation of the corresponding modulation sidebands. This is because while a fixed fraction of the input voltage matches the voltage feedback signal when the load is unmodulated, the repartition between the voltage and current feedback components varies when the load is modulated.

The antenna port voltages for the embodiments of FIGS. 3, 4, 5 and 6 vary if the antenna port load varies, because RFID 200 is designed to provide a finite output impedance. In another embodiment, however, the voltage Vin may be adapted to maintain the antenna port voltage at a preferred level, for example close to the maximum at which the IC fabrication process permits.

Figure 7:
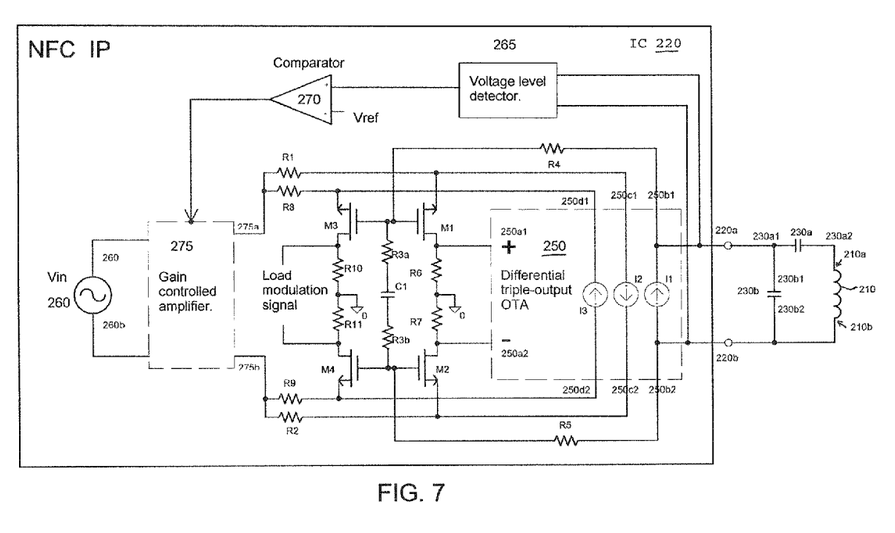
FIG. 7 is an example schematic of a RFID circuit according to a fifth embodiment.

This can be accomplished by incorporating an automatic level control (ALC) circuit.

FIG. 7 shows another embodiment of the IC 220 shown in FIG. 6 that is configured with an automatic level control (ALC) circuit. For example, the ALC includes a voltage level detector 265, a voltage comparator 270, and a variable gain amplifier 275. Details of these elements are not illustrated since their specific circuitry can be implemented in many ways to perform their functions and that the configurations may depend on the characteristics of the IC fabrication process and/or on design choices pertaining to the complete RFID unit.

In one embodiment, the voltage level detector 265 may be configured to provide an output which rapidly tracks the peak signal level, including the modulation envelope when load modulation is expected, or it may be configured to act as a peak detector, providing an output which responds rapidly to an increase in the signal envelope but slowly to a reduction. Conceptually, an ALC loop employing a peak voltage detector could remain active while the reader transmits data.

If a peak detector is used, the input voltage $V_{in}$ may adapt to an initial load reduction when load modulation is initiated by a tag, but will remain substantially constant during the load modulation interval. The load modulation signal is then produced in the manner described for the forgoing embodiments.

If a detector which tracks the modulation envelope is used, the voltage at the output of the variable gain block will be modulated to suppress load modulation of the antenna port voltage. This suppression increases the modulation of the antenna port current. It can be shown that this produces a load modulation signal with a modulation index which is equal to, or higher than, that produced when a peak detector is used.

Figure 8:
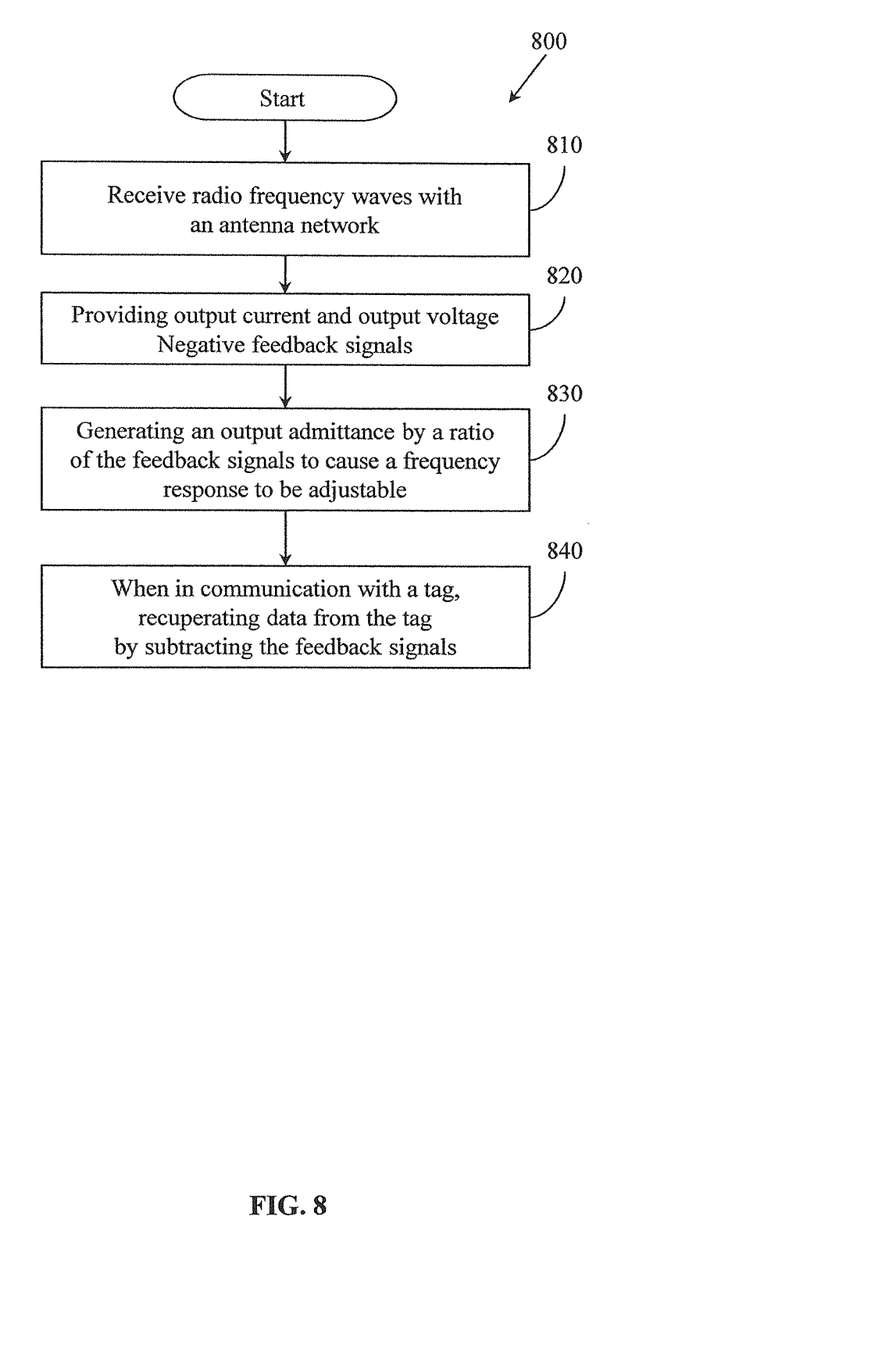
FIG. 8 is one embodiment of a method associated with a RFID circuit.

FIG. 8 illustrates one embodiment of a method 800 for processing wireless signals by the RFID circuit 200 shown in FIGS. 2 and 3. At 810, radio frequency waves are received with an antenna network including an antenna 210 and an antenna interface 225 coupled to the antenna 210 (as shown in FIGS. 2 and 3). As explained previously, the integrated circuit 220 is configured to operate as a reader and a tag in combination with the antenna network. At 820, output current and output voltage negative feedback signals are provided from the antenna network to the integrated circuit 220. For example, two feedback paths are illustrated in FIG. 3, one path including resistor R4 and the other including the path with resistor R5.

At 830, an output admittance is generated and determined by a ratio of the output current and output voltage negative feedback signals when operating as a reader. This causes a frequency response of the integrated circuit 220 and the antenna network to be adjustable to selected characteristics without increasing power consumption. These features are described in relation to the FIG. 3 and are not repeated here.

At 840, when the integrated circuit 220 is in communication with a nearby tag, data from the tag is recuperated by subtracting the output current and output voltage negative feedback signals to generate a signal with a greater modulation index. These features are described in relation to the FIG. 3 and are not repeated here.

With the embodiments of the IC 220 and the antenna interface 225 as disclosed herein, the IC 220 is configured to produce an output conductance and/or susceptance at the antenna port 220a, 220b by applying voltage and current negative feedback around the output amplifier 250. The two feedback signals are added and their ratio determines the output impedance. Producing an output conductance in this manner allows control of the bandwidth of the system at no cost in power consumption. For example, the output impedance is used for controlling the bandwidth and the resonance of the antenna connected to the antenna network. This is in contrast to the use of switching resistors across the port as in FIG. 1, which would considerably increase the power consumption.

In another embodiment, the IC 220, when acting as a so-called "reader" is configured to extract a signal produced by a tag with which it communicates. The tag (not shown) returns data by effectively switching a capacitor or resistor across its antenna coil. This produces a corresponding variation of the impedance of the antenna 210.

In the prior art, this data was recuperated from the variation in the output current. With the present IC 220, the data is recuperated by subtracting the voltage and current feedback signals, which provides a signal with a higher modulation index.

In another embodiment, the IC 220 can further increase the modulation index of the recuperated load modulation signal by subtracting a carrier component from it.

DEFINITIONS

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. A radio frequency identification (RFID) circuit comprising:
    an antenna network, including an antenna and an antenna interface coupled to the antenna, configured to transmit and receive radio frequency waves, wherein the antenna interface includes at least one capacitor coupled with the antenna; and
    an integrated circuit including at least one pin coupled to at least one node of the at least one capacitor of the antenna interface, wherein the integrated circuit is configured to operate as a reader and a tag in combination with the antenna network, and
    wherein the integrated circuit comprises output current and output voltage negative feedback loops and is configured to provide an output admittance determined by a ratio of signals from the current and voltage negative feedback loops, at least when the RFID operates as a reader, such that a frequency response of the combined integrated circuit and antenna is adjustable to selective characteristics when operating as the reader.

2. The RFID circuit according to claim 1, wherein the current and voltage negative feedback signals of the integrated circuit are configured such that the output admittance includes a resistive component, which is configured to increase an operational bandwidth of the combined integrated circuit and antenna network to a selected value.

3. The RFID circuit according to claim 1, wherein the current and voltage negative feedback signals of the integrated circuit are configured such that the output admittance includes a reactive component, which is configured to tune a resonant frequency of the combined integrated circuit and antenna network to a selected value.

4. The RFID circuit according to claim 1, wherein a signal voltage developed by the integrated circuit at the antenna interface is adjustable to a selected level by an automatic level control loop comprising:

a voltage level detector coupled to an input to the antenna interface, a voltage comparator configured to provide an output in response to the difference between a output of the voltage level detector and a reference voltage, and a variable gain circuit configured to receive a constant input signal voltage and provide a gain responsive to the output of the voltage comparator and having an output coupled to an input of an amplifier means configured in the integrated circuit.

5. The RFID circuit according to claim 1 wherein the integrated circuit includes an amplifier means for amplifying signals and wherein said amplifier means is configured to provide a plurality of proportional output current signals, wherein a first output current signal is coupled to flow between a first pin and a second pin of the at least one pin to provide power to the antenna network, a second output current signal is coupled to the amplifier means input via circuit means, to provide a negative feedback signal, and a third output current signal is connected to provide an input to circuit means producing an output responsive to load modulation of a tag when the tag is electromagnetically coupled to the antenna.

6. The RFID circuit according to claim 5, wherein one of said output current signals provides a signal proportional to an input admittance of the antenna network, wherein the antenna network is configured to receive data transmitted from the tag coupled electromagnetically to the antenna, by a modulation of a load of the tag.

7. The RFID circuit according to claim 5, wherein the integrated circuit is configured such that one of said output current signals develops a voltage from which is subtracted an image of the voltage developed at the antenna interface, to provide a signal proportional to an input admittance of the antenna network, wherein the antenna network is configured to receive data transmitted from a tag coupled electromagnetically to the antenna, by a modulation of a load of the tag.

8. The RFID circuit according to claim 1, wherein the at least one capacitor comprises a first capacitor and a second capacitor coupled in series with the antenna.

9. A radio frequency identification (RFID) circuit comprising:

an antenna network including an antenna and an antenna interface coupled to the antenna, configured to transmit and receive radio frequency waves, wherein the antenna interface includes a first capacitor and a second capacitor coupled in series with the antenna; and an integrated circuit including an antenna port comprising a first contact and a second contact coupled respectively to a first node and a second node of the second capacitor of the antenna interface, wherein the integrated circuit is configured to operate as a reader and a tag in combination with the antenna network;

wherein the integrated circuit includes an output current and output voltage negative feedback loops from the first contact and the second contact that are input to an output amplifier; and wherein the integrated circuit is configured to produce a controllable output admittance at the antenna port by applying signals from the output current and output voltage negative feedback loops around the output amplifier.

10. The radio frequency identification circuit of claim 9, wherein the first capacitor of the antenna interface includes a first node connected to the first contact of the antenna port and to the first node of the second capacitor; and a second node of the first capacitor is connected to a first node of the antenna;

wherein the second node of the second capacitor of the antenna interface is connected to a second node of the antenna and to the second contact of the antenna port.

11. The radio frequency identification circuit of claim 9, wherein the integrated circuit is configured to combine the signals from the output current and output voltage negative feedback loops and where a ratio of the signals determines an output admittance for controlling a bandwidth and a resonance frequency of the combined integrated circuit and antenna network, to a selected value.

12. The radio frequency identification circuit of claim 9, wherein the output voltage negative feedback point is connected to a gate of a first transistor and to a gate of a second transistor, wherein the output current negative feedback points are connected to a source of the first transistor and to a source of the second transistor, wherein a drain of the first transistor is connected to a first input of the output amplifier and a drain of the second transistor is connected to a second input of the output amplifier.

13. The radio frequency identification circuit of claim 9, wherein integrated circuit is configured to recuperate data from a tag in communication with the integrated circuit by combining the signals from the outputs of the current and voltage negative feedback loops and the transmit input signal, to generate a signal with a high modulation index and reduced carrier amplitude.

14. The radio frequency identification circuit of claim 9, wherein the output amplifier is a differential operational transconductance amplifier having input nodes coupled to a carrier signal generator, and wherein the output amplifier is configured to provide a first output current flowing between nodes coupled to the antenna port.

15. A method comprising:

receiving radio frequency waves with an antenna, and wherein an integrated circuit is configured to operate as a reader and a tag in combination with the antenna network;

providing an output current negative feedback signal and an output voltage negative feedback signal from the antenna to the integrated circuit; and generating an output admittance determined by a ratio of the output current negative feedback signal and the output voltage negative feedback signal when operating as a reader to cause a frequency response of the integrated circuit and the antenna to be adjustable to selected characteristics without increasing power consumption.

16. The method of claim 15, further comprising recuperating data from a tag in communication with the integrated circuit by combining the output current and output voltage negative feedback signals to generate a signal with a greater modulation index and a lower carrier amplitude.

17. The method of claim 15, further comprising producing an output impedance at an antenna port connecting the integrated circuit and an antenna interface by applying the output current and output voltage negative feedback signals around an output amplifier in the integrated circuit; and adding the output current and output voltage negative feedback signals wherein a ratio of the signals determines an output impedance for controlling a bandwidth and a resonance of the antenna.

* * * * *